United States Patent [19]
Herzig

[11] Patent Number: 4,774,443
[45] Date of Patent: Sep. 27, 1988

[54] DRIVING MECHANISM FOR A SWITCH

[75] Inventor: Peter Herzig, Aarau, Switzerland

[73] Assignee: BBC Brown, Boveri & Company Ltd., Sweden

[21] Appl. No.: 805,183

[22] Filed: Dec. 5, 1985

[30] Foreign Application Priority Data

Dec. 19, 1984 [CH] Switzerland ............... 201/85

[51] Int. Cl.$^4$ .............................................. H02P 1/00
[52] U.S. Cl. ..................... 318/293; 318/439; 318/139; 318/345 R; 318/282; 307/122; 307/146
[58] Field of Search ............... 307/122, 139, 146; 318/280, 281, 282, 287, 289, 291, 293, 294, 372, 439, 38, 273, 257, 443, 444, 445, 446, 447, 466

[56] References Cited

U.S. PATENT DOCUMENTS

| | | | |
|---|---|---|---|
| 2,604,497 | 7/1952 | Morrison | 307/139 X |
| 3,050,672 | 8/1962 | Alexanderson | 318/300 X |
| 3,194,994 | 7/1965 | Latta | 307/151 X |
| 3,287,569 | 11/1966 | Carney | 318/138 X |
| 3,333,171 | 7/1967 | Platnick | 318/439 X |
| 3,398,344 | 8/1968 | McCormick | 318/351 X |
| 3,568,024 | 3/1971 | Robbins | 318/280 X |
| 3,598,934 | 8/1971 | O'Connor | 200/157 |
| 3,602,789 | 8/1971 | Rudolf | 318/280 X |
| 3,634,874 | 1/1972 | Mason | 318/345 H |
| 3,639,822 | 2/1972 | Brown et al. | 318/345 H |
| 3,678,360 | 7/1972 | Minarik et al. | 318/332 |
| 3,697,839 | 10/1972 | Unnewehr | 318/139 |
| 3,731,172 | 5/1973 | Kaufman | 318/439 |
| 3,745,439 | 7/1973 | Belmuth | 318/332 |
| 3,748,554 | 7/1973 | McDonald | 318/439 X |
| 3,777,239 | 12/1973 | Seri et al. | 318/345 G |
| 3,783,361 | 1/1974 | Mason | 318/331 |
| 3,808,484 | 4/1974 | Trotta | 318/282 X |
| 3,849,718 | 11/1974 | Forster et al. | 318/138 X |
| 3,924,168 | 12/1975 | Woodward | 318/294 X |
| 4,042,865 | 8/1977 | Gurwicz | 318/338 |
| 4,134,051 | 1/1979 | Pelchat et al. | 318/282 |
| 4,145,640 | 3/1979 | Kipp et al. | 318/293 X |
| 4,214,190 | 7/1980 | Ottoson | 318/356 |
| 4,220,901 | 9/1980 | Dummer | 200/157 X |
| 4,223,256 | 9/1980 | Espenschied | 318/282 |
| 4,232,258 | 11/1980 | Matsummura | 318/345 H |
| 4,329,630 | 5/1982 | Park | 318/293 X |
| 4,362,975 | 12/1982 | Orsini | 318/293 |
| 4,476,416 | 10/1984 | Licata et al. | 318/293 X |
| 4,494,181 | 1/1985 | Ramlohr et al. | 318/280 X |

FOREIGN PATENT DOCUMENTS 610757 2/1935 Fed. Rep. of Germany ...... 318/293

Primary Examiner—William M. Shoop, Jr.
Assistant Examiner—Paul Ip
Attorney, Agent, or Firm—Ostrolenk, Faber, Gerb & Soffen

[57] ABSTRACT

A driving mechanism, preferably provided for a high-voltage isolating switch (T), contains a driving motor (M) which acts upon a moving contact of the switch via a shaft (W) and is provided with a rotor winding (R) and a stator winding (S), connected in series. To control a direction of rotation of the driving motor (M) in dependence on the position of the switch, the driving mechanism also contains a control circuit. In this driving mechanism, it is intended to keep the number of cores of a connecting cable (L) from the driving mechanism housing (K) to a control cabinet (N) as small as possible. This is achieved by means of a control circuit having a rectifier (G) which can be controlled in dependence on the position of the switch and one alternating-current input of which is preceded by either the stator (S) or the rotor winding (R) of the driving motor (M) and the direct-current output of which is connected to the winding (for example rotor winding R) located in series with the preceding winding (for example stator windings S) of the driving motor (M).

9 Claims, 1 Drawing Sheet

DRIVING MECHANISM FOR A SWITCH

BACKGROUND AND SUMMARY OF THE INVENTION

The present invention is directed to a driving mechanism for a switch.

The invention refers generally to a driving mechanism such as is used, for example with the switch known from Brown Boveri Report 65, 1978 (4), pages 236–239. In the case of the known driving mechanism, the stator winding connections and the connections of two contacts indicating the switch position are located out of the driving mechanism housing and cabled in a control cabinet. This requires at least eight control cable cores.

The invention as characterised in the Claims achieves the object of specifying a driving mechanism of the above type, in which the largest proportion of the control cable cores between driving mechanism housing and control cabinet has been saved while retaining good operational reliability.

The driving mechanism according to the invention is characterised by the fact that only one two-core power connection for the driving motor is cabled between the driving mechanism housing and the control cabinet. In contrast, the mechanism for controlling the direction of rotation of the driving motor is accommodated directly in the driving mechanism housing. This control mode is effected directly by means of position contacts, without using elaborate control contactors.

The invention is explained below in greater detail with the aid of an illustrative embodiment described in the drawing, in which;

DETAILED DESCRIPTION

Figure 1:
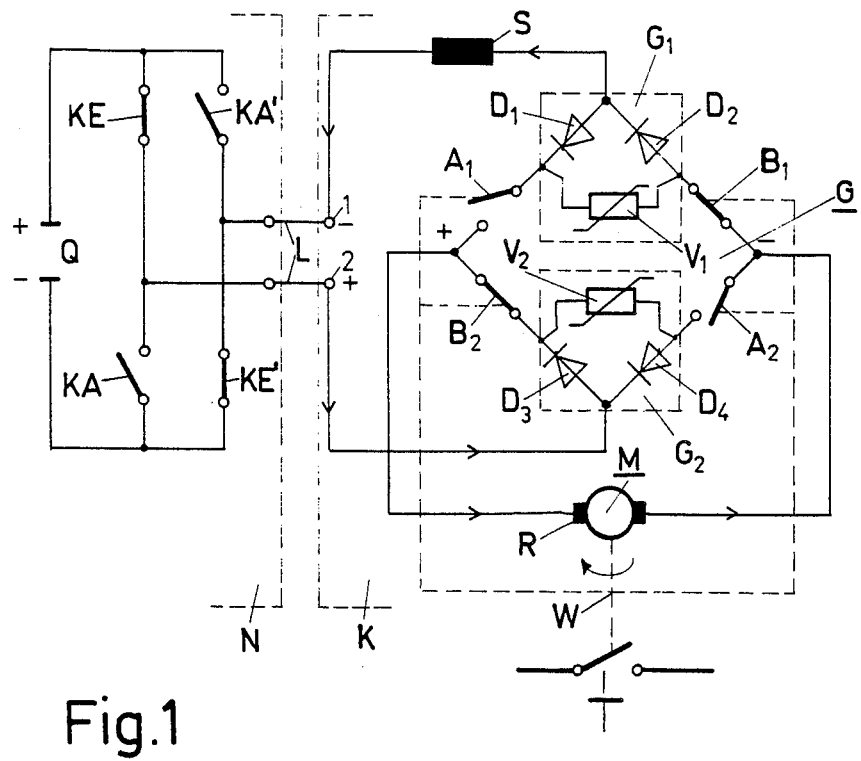
FIG. 1 shows a circuit diagram of a driving mechanism in accordance with the present invention. The switch is shown in a state immediately after a switching-on command has been given to a switch to be operated.

The Figures show an isolating switch T of a high-voltage switching system, the moving contact of which is acted upon by a shaft W which is rotable by a driving motor M. The shaft W also acts upon contacts $A_1$, $A_2$, $B_1$, $B_2$. These contacts indicate the switched position of the isolating switch T. Contacts $A_1$ and $A_2$ remain opened when isolating switch T is open. They close during the switching-on process of switch T. Contacts $B_1$ and $B_2$ remain closed when isolating switch T is open and they are opened during the switching-on process after contacts $A_1$ and $A_2$ are already closed. Correspondingly, the contacts $B_1$ and $B_2$ are opened when the isolating switch T is closed and close during the switching-off process. The contacts $A_1$ and $A_2$ are closed when the isolating switching T is closed and are opened during the switching-off process when the contacts $B_1$ and $B_2$ are already closed.

The driving motor M is located in a driving mechanism housing K, having a two-pole power connection comprising poles 1 and 2 which are connected via a two-core connecting or switching cable L to a power connection of a control cabinet N.

The driving motor M is constructed as a series-wound motor having windings which are connected in series. One connection of a winding constructed as the stator winding S can be connected to one pole of a current source Q located in the control cabinet N and its other connection is connected to an alternating-current connection of a rectifier G provided in the driving mechanism housing K. The connections of a winding constructed as the rotor winding R of the driving motor M are in each case connected to one pole of the direct-current output of the rectifier G.

The rectifier G is connected as a bridge and is formed by two half wave bridge modules $G_1$ and $G_2$, which are connected in parallel with each other and which in each case contain two diodes $D_1$ and $D_2$, and $D_3$ and $D_4$, which are connected in series in the same direction. In parallel with the diodes $D_1$ and $D_2$, and $D_3$ and $D_4$, of each half wave bridge module $G_1$ and $G_2$, respectively, a voltage-dependent resistor $V_1$ and $V_2$ is connected in each case which protects the diodes $D_1$ and $D_2$, and $D_3$ and $D_4$ against any overvoltages which may occur. Contacts $A_1$, $A_2$, $B_1$ and $B_2$ are located between the junctions, of equal polarity and acting as direct-current output, of the diodes $D_1$ and $D_3$, and $D_2$ and $D_4$, and the diodes $D_1$, . . . $D_4$. The contacts $A_1$ and $B_2$ are connected between the positive pole of the direct-current output of the rectifier G and the diodes $D_1$ and $D_3$. Contacts $A_2$ and $B_1$ are connected between the negative pole of the direct-current output and the diode $D_2$ and $D_4$ respectively. The contacts are arranged in such a manner that two contacts, which in each case indicate the switched-on or switched-off condition of the isolating switch T, for example $A_1$ and $A_2$, are located in diagonally opposite bridge branches of rectifier G.

The direct-current source Q can be connected to the poles or control terminals 1 and 2 of the power connection of the driving mechanism housing K via contacts KE and KE' during the switching-on process and via switch contacts KA and KA' during the switching-off process. During the switching-on process, the contacts KE and KE' are simultaneously closed, while contacts KA and KA' are opened, and opened after the switching-on process is completed. Correspondingly, contacts KA and KA' are simultaneously closed during the switching-off process, while contacts KE and KE' are opened, and opened after the switching-off process is completed. The contacts KE, KE', KA and KA' are arranged in a bridge circuit in such a manner that, during the switching-on process, the positive pole of the direct-current source Q is connected via the contact KE to pole 2 and the negative pole is connected via the contact KE' to pole 1 of the power connection of driving mechanism housing K. During the switching-off process, the positive pole of the direct-current source Q is connected via contact KA' to pole 1 and the negative pole is connected via the contact KA to pole 2. This changes the polarity of the direct-current source Q at the power connection of the driving mechanism housing K as compared with the polarity during the switching-on process.

The driving mechanism according to the invention operates as follows: if the isolating switch T is opened, as shown in FIG. 1, the switching-on process is initiated by giving a switching-on command in a command circuit, not shown. The direct-current source Q is then to the power connection of the driving mechanism housing K by closing contacts KE and KE'. Pole 1 of the power connection is then at negative potential and pole 2 at positive potential.

In the opened condition, shown in FIG. 1, of the isolating switch T, the contacts $A_1$ and $A_2$ of the contacts indicating the switch position are opened but contacts $B_1$ and $B_2$ are closed. For this reason, a direct current flows through the driving motor M which is directed from pole 2 via diode $D_3$, contact $B_2$, the rotor winding R, contact $B_1$, diode $D_2$ and the stator winding S to pole 1. The direction of this direct current is indicated by arrows in FIG. 1. This direct current causes magnetic fields to be built up in rotor R and stator winding S which impose a specific direction of rotation (for example in the clockwise direction) on the driving motor M and thus the shaft W.

Although contacts $A_1$ and $A_2$ will also close in the further course of the switching-on process, the direct current retains its sense of direction and its current path. As soon as the isolating switch T is closed, the contacts $B_1$ and $B_2$ open. Shortly thereafter, contacts KE and KE' also open which causes the direct-current source Q to be disconnected from the power connection of the driving mechanism housing K.

The switching-off process is initiated by giving a switching-off command in the command circuit, not shown, and the direct-current source Q is applied to the power connection of the driving mechanism housing K by closing the contacts KA and KA'. Pole 1 of the power connection is then at positive potential and pole 2 is at negative potential.

Figure 2:
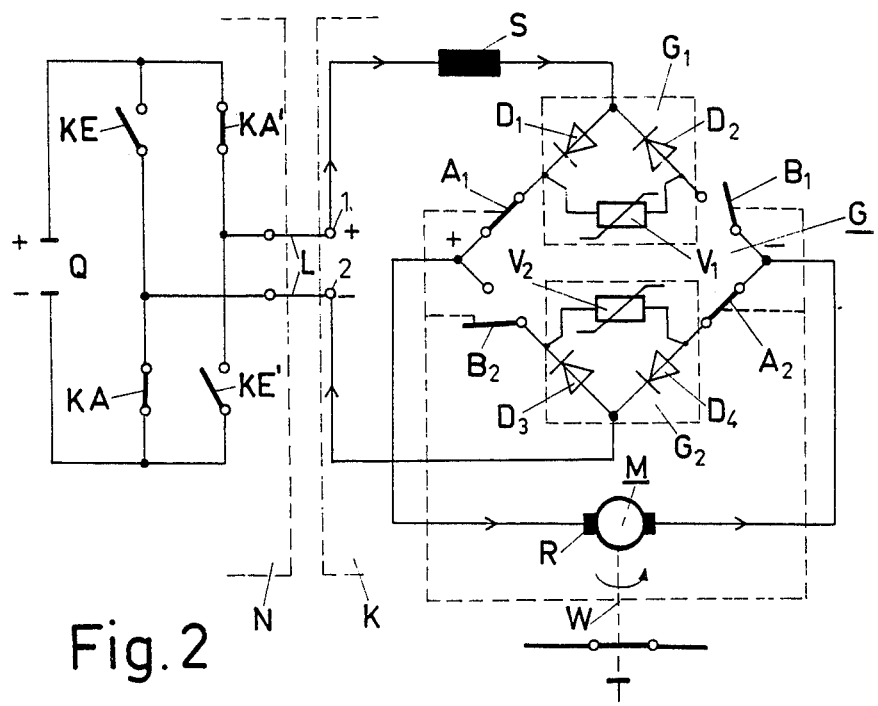
FIG. 2 shows the circuit diagram of FIG. 1, but immediately after a switching-off command has been given to the switch.

In the case of the closed isolating switch T shown in FIG. 2, contacts $B_1$ and $B_2$ of the contacts indicating the switch position are opened and contacts $A_1$ and $A_2$ are closed. For this reason, a direct current flows through the driving motor M which is directed from pole 1 via stator winding S, diode $D_1$, contact $A_1$, rotor winding R, contact $A_2$ and diode $D_4$ to pole 2. The direction of this direct current is indicated by arrows in FIG. 2. This direct current causes magnetic fields to be built up in rotor R and stator winding S. Since the direct current in the stator winding S is directed opposite to the direct current flowing in the stator winding S after the switching-on process (FIG. 1), and direct currents in the rotor winding R flow in the same direction both during the switching-on and during the switching-off process, the magnetic fields built up in the stator S and rotor winding R impose on the driving motor M, and thus on the shaft W, a direction of rotation which is opposite to the direction of rotation during the switching-on process (for example in the counter clockwise direction), which causes the isolating switch T to be opened.

Although, the contacts $B_1$ and $B_2$ will also close when the isolating switch T opens, the direct current retains its sense of direction and its current path. As soon as the isolating switch T is opened, the contacts $A_1$ and $A_2$ open. Shortly thereafter, the contacts KA and KA' also open which causes the direct current source Q to be disconnected from the power connection of the driving mechanism housing K.

It is also possible to connect, instead of the rotor winding R of the driving motor M, the stator winding S to the direct-current output of the rectifier G. In this case, it is the rotor winding R instead of the stator winding S which must be arranged between one of the alternating-current connections of the rectifier G and the direct-current source Q.

What is claimed is:

1. A driving mechanism for a motor, comprising:

a motor having a shaft, a first winding, and a second winding;

a pair of control terminals including a first control terminal and a second control terminal;

control means for selectively supplying to said first and second control terminals a dual polarity direct current of a first or second polarity, said direct current entering one of said terminals and flowing out of the other one of said terminals;

said first winding having first and second connection points, the first connection point being electrically coupled to said first control terminal;

a bridge rectifier electrically coupled to the second connection point of said first winding, said bridge rectifier being effective for converting the dual polarity direct current associated with said control terminals into a constant polarity direct current having a polarity which remains constant irrespective of the actual polarity of said dual polarity direct current;

said second winding being coupled to said bridge rectifier such that said constant polarity direct current flows from said bridge rectifier into said second winding;

said motor being rotatable to an ON position in response to the application of said direct current with said first polarity and to an OFF position in response to the application of said direct current with said second polarity, said mechanism further comprising switch contacts connected in said bridge rectifier, said switch contacts being coupled to said shaft of said motor and being effective for indicating whether said motor is in its said ON position or said OFF position; and said bridge rectifier being further coupled to said second control terminal, whereby reversal of the polarity of said dual polarity direct current supplied to said control terminals causes a reversal in current direction only through said first winding while the current direction flowing through said second winding remains constant and whereby the direction of rotation of said motor is controlled by selection of the current polarity at said control terminals.

2. The driving mechanism of claim 1, wherein said first winding is a stator winding and said second winding is a rotor winding.

3. The driving mechanism of claim 1 further comprising an isolation switch which is coupled to said shaft of said motor, said motor being effective to change the condition of said isolation switch from an open condition to a closed position and vice versa.

4. The driving mechanism of claim 1, said control means comprising a source of DC power and switch contact means between said source of DC power and said pair of control terminals for applying power from said source of power to said pair of control terminals and for selectively reversing the polarity of said power.

5. The driving mechanism of claim 1 wherein said bridge rectifier includes four bridge branches each containing a respective diode and wherein at least one of said switch contacts is respectively located in each one of said bridge branches.

6. The driving mechanism of claim 5 further comprising voltage dependent resistor means connected in parallel across said diodes of said bridge rectifier in a configuration which is effective to protect said diodes from being overstressed.

7. The driving mechanism of claim 1, wherein said bridge rectifier comprises a first terminal, a second terminal, a positive terminal and a negative terminal and wherein said second winding is connected between said positive and negative terminals of said bridge rectifier and further wherein said first winding is connected in series between one of said pair of control terminals and one of said first and second terminals of said bridge rectifier.

8. The driving mechanism of claim 5, wherein said switch contacts comprise first, second, third and fourth switches, each one of said switch contacts being connected in series in a respective one of said bridge branches.

9. The driving switch of claim 6, wherein said bridge rectifier comprises a first terminal, a second terminal, a positive terminal and a negative terminal, said second winding being connected between said positive and negative terminals of said bridge rectifier and further wherein said first winding is connected between one of said pair of control terminals and one of said first and second terminals of said bridge rectifier, said four bridge branches being comprised of first, second, third and fourth bridge branches, which respectively include, first, second, third and fourth ones of said respective diodes, said voltage dependent resistor means including first and second resistor means said first resistor means being connected in parallel across said first and second diodes and said second resistor means being connected in parallel across said third and fourth diodes.

* * * * *